(12) United States Patent
Gupta et al.

(10) Patent No.: US 9,898,554 B2
(45) Date of Patent: Feb. 20, 2018

(54) IMPLICIT QUESTION QUERY IDENTIFICATION

(71) Applicant: Google Inc., Mountain View, CA (US)

(72) Inventors: Nitin Gupta, Mountain View, CA (US); Preyas Popat, Mountain View, CA (US); Steven D. Baker, Mountain View, CA (US); Srinivasan Venkatachary, Mountain View, CA (US)

(73) Assignee: Google Inc., Mountain View, CA (US)

( * ) Notice: Subject to any disclaimer, the term of this patent is extended or adjusted under 35 U.S.C. 154(b) by 926 days.

(21) Appl. No.: 14/083,057

(22) Filed: Nov. 18, 2013

(65) Prior Publication Data
US 2015/0142851 A1 May 21, 2015

(51) Int. Cl.
*G06F 7/00* (2006.01)
*G06F 17/30* (2006.01)

(52) U.S. Cl.
CPC .............. *G06F 17/30967* (2013.01)

(58) Field of Classification Search
CPC ................ G06F 17/30654; G06F 17/248
USPC ......................................................... 707/779
See application file for complete search history.

(56) References Cited

U.S. PATENT DOCUMENTS

| | | | |
|---|---|---|---|
| 5,884,302 A | 3/1999 | Ho | |
| 6,289,513 B1 * | 9/2001 | Bentwich | G06F 8/30 706/45 |
| 6,584,464 B1 * | 6/2003 | Warthen | G06F 17/30398 |
| 6,618,722 B1 * | 9/2003 | Johnson | G06F 17/30672 |
| 6,665,666 B1 | 12/2003 | Brown | |
| 7,461,047 B2 | 12/2008 | Masuichi | |
| 7,590,603 B2 | 9/2009 | Zhang | |
| 8,024,332 B2 | 9/2011 | Cao | |
| 8,027,973 B2 | 9/2011 | Cao | |
| 8,135,712 B1 | 3/2012 | Coladonato | |
| 8,359,326 B1 * | 1/2013 | Garg | G06F 17/30864 707/705 |
| 9,058,393 B1 * | 6/2015 | Nicks | G06Q 30/0283 |
| 2003/0093276 A1 * | 5/2003 | Miller | G10L 15/22 704/257 |
| 2004/0117352 A1 * | 6/2004 | Schabes | G06F 17/30684 |
| 2004/0243568 A1 * | 12/2004 | Wang | G06F 17/3043 |
| 2004/0249796 A1 | 12/2004 | Azzam | |

(Continued)

OTHER PUBLICATIONS

D.S. Wang, "A Domain-Specific Question Answering System Based on Ontology and Question Templates", 2010.*

(Continued)

*Primary Examiner* — Binh V Ho
(74) *Attorney, Agent, or Firm* — Fish & Richardson P.C.

(57) ABSTRACT

Methods, systems, and apparatus, including computer programs encoded on a computer storage medium, for identifying implicit question queries. In one aspect, a method includes receiving a query in unstructured form, comparing terms of the query to query templates, determining, based on the comparison, a match of the query terms to a first query template, wherein the first query template is not determined to be indicative of a question query, determining, based on the first query template, a second query template, and determining that the query is an implicit question query in response to the second query template being indicative of a question queries.

10 Claims, 5 Drawing Sheets

(56) References Cited

U.S. PATENT DOCUMENTS

| | | | |
|---|---|---|---|
| 2005/0033617 A1* | 2/2005 | Prather | G09B 7/00 434/323 |
| 2005/0080614 A1* | 4/2005 | Bennett | G06F 17/27 704/9 |
| 2006/0026593 A1* | 2/2006 | Canning | G06F 9/4843 718/100 |
| 2007/0260450 A1* | 11/2007 | Sun | G06F 17/30625 704/9 |
| 2007/0282805 A1* | 12/2007 | Janzen | G06F 17/30306 |
| 2008/0172622 A1* | 7/2008 | Roche | G06F 17/30654 715/762 |
| 2009/0019020 A1* | 1/2009 | Dhillon | G06F 17/30398 |
| 2010/0145976 A1* | 6/2010 | Higgins | G06F 17/3064 707/765 |
| 2010/0235164 A1 | 9/2010 | Todhunter | |
| 2013/0226846 A1* | 8/2013 | Li | G06N 5/02 706/12 |
| 2014/0006012 A1* | 1/2014 | Zhou | G06F 17/30654 704/9 |
| 2014/0358889 A1* | 12/2014 | Shmiel | G06F 17/2745 707/710 |

OTHER PUBLICATIONS

U.S. Appl. No. 13/908,508, filed Jun. 3, 2013, Query Suggestion Templates.

U.S. Appl. No. 13/941,586, filed Jul. 15, 2013, Semantically Equivalent Query Templates.

Wang, A Domain-Specific Question Answering System Based on Ontology and Question, IEEE Computer Society, 2010 11th ACIS International Conference on Software Engineering, pp. 151-156.

Bhatia et al., Analysis and Automatic Classification of Web Search Queries for Diversification Requirements, ASIST 2012, Oct. 28-31, 2012, Baltimore, MD, 10 pages.

* cited by examiner

IMPLICIT QUESTION QUERY IDENTIFICATION

BACKGROUND

This specification relates to search engine query processing.

The Internet provides access to a wide variety of resources, such as image files, audio files, video files, and web pages. A search system can identify resources in response to queries submitted by users and provide information about the resources in a manner that is useful to the users.

Users of search systems are often searching for an answer to a specific question, rather than a listing of resources. For example, users may want to know what the weather is in a particular location, a current quote for a stock, what the definition of a particular word is, etc. When queries that are in the form of a question are received, some search engines may perform specialized search operations in response to the question format of the query. For example, some search engines may provide information responsive to such queries in the form of an "answer," such as information provided in the form of a "one box" to a question.

SUMMARY

In general, one innovative aspect of the subject matter described in this specification can be embodied in methods that include the actions of receiving a query in unstructured form, the query including a plurality of terms, each of the terms at a respective ordinal position in the query; comparing the terms of the query to a plurality of query templates, each query template including terms of variable data and terms of invariable data, wherein the terms of variable data specifies a class of terms and the terms of invariable data specifies particular instances of terms; determining, based on the comparison, a match of the query terms to a first query template, wherein the first query template is not determined to be indicative of a question query; determining, based on the first query template, a second query template; and determining that the query is an implicit question query in response to the second query template being indicative of a question queries. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Queries that are implicit answer-seeking queries, which are also referred to as "implicit question queries," can be identified absent of any necessary query structure. The query need not include interrogative terms, such as "who is" "where is," "why is," "how much is . . . " Identification of implicit queries can be done without the use of extensive language models or machine learned solutions, which reduces implementation complexities and implementation time. Furthermore, when the identification of implicit question queries are based on query templates that are learned from actual queries, the mapping of implicit question queries to actual question queries is emergent as the mapping is based on the observed behavior of a large number of users. Such mapping is reflective of the natural interpretations of users and is thus less susceptible to training error than language models or machine learned models.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Users often use search engines to seek for "answers" rather than a breadth of information. An answer is a fact or relation that is responsive to a question. A "question query" differs from an informational query in that the question query seeks the answer, while the informational query is a request for a variety of different types of information for a subject. For example, the question query "How high is Pikes Peak" is a structured query that clearly requests a fact—the height of Pikes Peak. A search engine can detect the structured nature of the query and interpret the query as a question query, and provide, in response to the query, a particular result that provides an answer to the question, and optionally other results. Conversely, the query "Pikes Peak" is not structured in a form that conveys a particular objective; a search engine thus interprets the query as an informational query, and provides, in response to the query, search results that reference a variety of information about Pikes Peak. The search results, however, may not prominently display the height of Pikes Peak, as it is unclear whether the user is primarily interested in this particular fact.

The subject matter of this application solves the technical problem of resolving the ambiguity of implicit question queries. In particular, the subject matter of this application identifies queries that are implicit question queries by accessing query templates. Each query template includes terms of variable data and terms of invariable data. The terms of the variable data specify a class of terms, and the terms of invariable data specifies particular instances of terms. For example, the term {CITY} is a variable data term that specifies a class of things, in this case, cities. The invariable terms are terms in the template that are not referenced by their respective classes, e.g., the "Height of" may be invariable terms.

When the received query matches at least some of the terms of a query template, the query template is used to determine whether the received query is indicative of a question query. There are several ways by which this determination can be made. One way is to find an alternate template to the matched template, and if the alternate template is indicative of a question query, then the received query is also indicative of a question query. Another way is to generate synthetic templates from the matched template by prepending interrogative terms to the matched template, such as "what is" and "who is," etc. If a synthetic template is an existing template and that is indicative of a question query, then the received query is also indicative of a question query.

These features, and additional features, such as template validation and query term pruning, are described in more detail in the sections that follow.

Example Operating Environment

Figure 1:
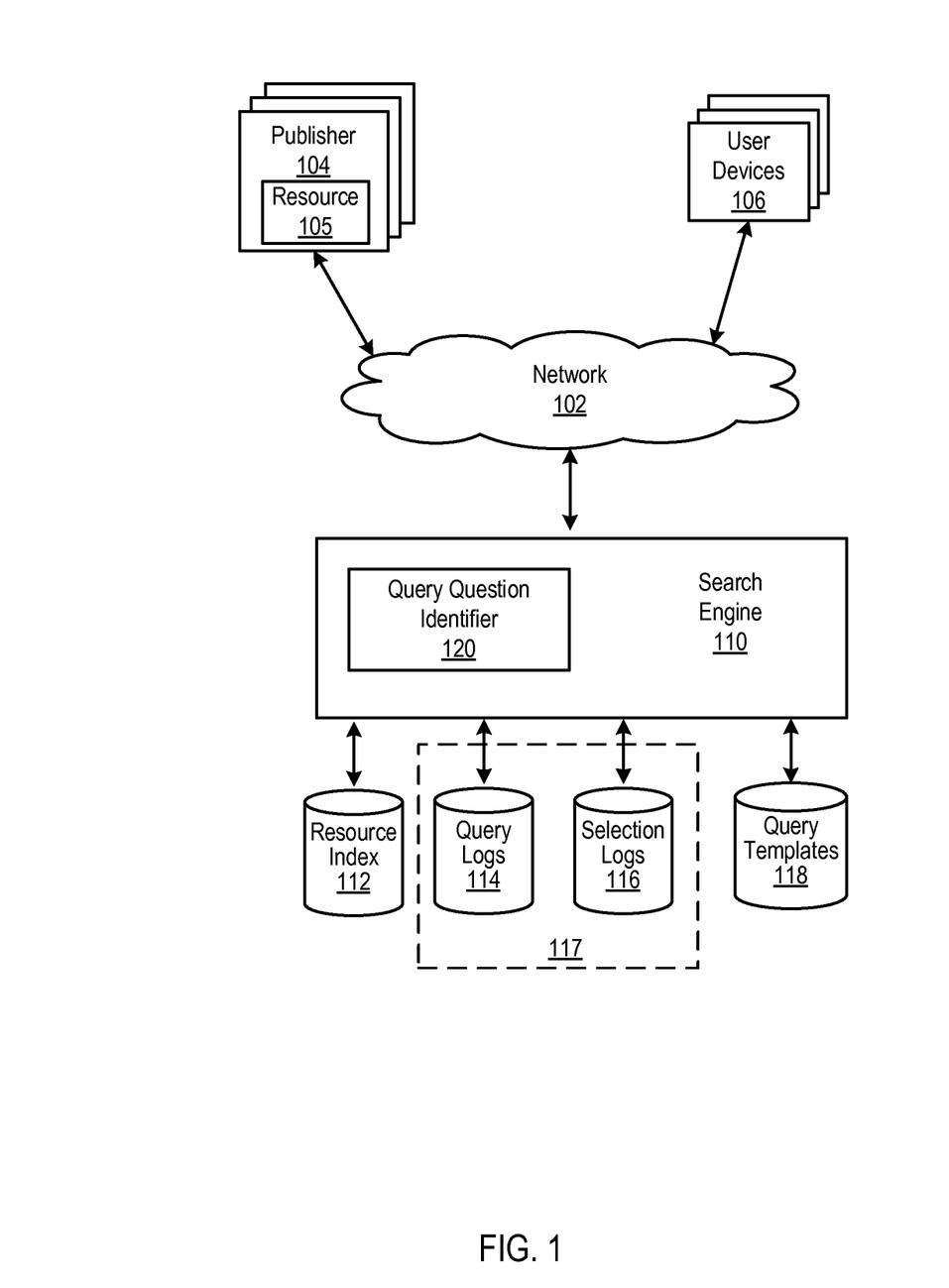
FIG. 1 is an environment in which implicit question queries are identified.

FIG. 1 is an environment 100 in which implicit question queries are identified. A computer network 102, such as the Internet, connects publisher websites 104, user devices 106, and a search engine 110. The online environment 100 may include many thousands of publisher websites 104 and user devices 106.

A publisher website 104 includes one or more resources 105 associated with a domain and hosted by one or more servers in one or more locations. Generally, a website is a collection of web pages formatted in hypertext markup language (HTML) that can contain text, images, multimedia content, and programming elements, for example, scripts. Each website 104 is maintained by a content publisher, which is an entity that controls, manages and/or owns the website 104.

A resource is any data that can be provided by a publisher website 104 over the network 102 and that has a resource address, e.g., a uniform resource locator (URL). Resources may be HTML pages, electronic documents, images files, video files, audio files, and feed sources, to name just a few. The resources may include embedded information, e.g., meta information and hyperlinks, and/or embedded instructions, e.g., client-side scripts.

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102. The web browser can enable a user to display and interact with text, images, videos, music and other information typically located on a web page at a website on the world wide web or a local area network.

To facilitate searching of these resources 105, the search engine 110 crawls the publisher websites 104 and indexes the resources provided by the publisher websites 104. The index data are stored in a resource index 112.

The user devices 106 submit search queries to the search engine 110. The search queries are submitted in the form of a search request that includes the search request and, optionally, a unique identifier that identifies the user device 106 that submits the request. The unique identifier can be data from a cookie stored at the user device, or a user account identifier if the user maintains an account with the search engine 110, or some other identifier that identifies the user device 106 or the user using the user device.

In response to the search request, the search engine 110 uses the index 112 to identify resources that are relevant to the queries. The search engine 110 identifies the resources in the form of search results and returns the search results to the user devices 106 in search results page resource. A search result is data generated by the search engine 110 that identifies a resource or provides information that satisfies a particular search query. A search result for a resource can include a web page title, a snippet of text extracted from the web page, and a resource locator for the resource, e.g., the URL of a web page.

The search results are ranked based on scores related to the resources identified by the search results, such as information retrieval ("IR") scores, and optionally a separate ranking of each resource relative to other resources (e.g., an authority score). The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the website 104 hosting the resource receives the request for the resource from the user device 106 and provides the resource to the requesting user device 106.

In some implementations, the queries submitted from user devices 106 are stored in query logs 114. Selection data for the queries and the web pages referenced by the search results and selected by users are stored in selection logs 116. The query logs 114 and the selection logs 116 define search history data 117 that include data from and related to previous search requests associated with unique identifiers. The selection logs represent actions taken in response to search results provided by the search engine 110. Examples of such actions include clicks on the search results. The query logs 114 and selection logs 116 can be used to map queries submitted by user devices to resources that were identified in search results and the actions taken by users when presented with the search results in response to the queries. In some implementations, data are associated with the identifiers from the search requests so that a search history for each identifier can be accessed. The selection logs 116 and query logs 114 can thus be used by the search engine to determine the respective sequences of queries submitted by the user devices, the actions taken in response to the queries, and how often the queries have been submitted.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The search engine 110 also has access to query templates 118. Each query template is a data structure that maps terms of variable data and terms of invariable data to a collection of queries. The terms of variable data specifies a class of terms and the terms of invariable data specifies particular instances of terms. The query templates 118 are provided by a system external to the search engine 110, or another subsystem of the search engine.

Query templates are derived from the search history data. Queries are collected and grouped according to common terms, and terms that the belong to certain classes—e.g., cities, persons, events—are removed and replaced with a class term that is the variable data. For example, the query logs 114 may include thousands of queries of the form [{DISH} recipe], e.g., [cheesecake recipe], [chocolate cake recipe], [chicken soup recipe], and so on. Each of these queries maps to the template [{DISH} recipe], where the term "{DISH}" is variable data and the term "recipe" is invariable data.

A received query maps to a particular template when its invariable terms map the invariable terms of the template, and when the remaining terms of the query map to the variable terms of the template, all in the same ordinal positions. Furthermore, a term in a query maps to a variable term when the term in the query is specified as being an instance of the variable term in the template. For example, the query [apple pie recipe] maps to the query template [{DISH} recipe] if the variable data {DISH} includes the term "apple pie" as an instance of the variable term {DISH}.

The query templates 118 also describe a linking between various templates, and each link may measure the similarity or equivalency of the template pairs. For example, the query template relations may be in the form of a graph structure, with each node representing a template and each edge between two templates representing an equivalency measure. Not all nodes are connected to each other node, however. The equivalency measure may be based, for example, on co-click data. Two query templates that map to two respective query sets that exhibit a high degree of co-clicks for search results thus have a stronger equivalency measure than two query templates that map to two respective query sets that exhibit a low degree of co-clicks for search results.

To illustrate, the query templates [capital of {COUNTRY}] and [what is the capital of {COUNTRY}] may have a very high degree of co-clicks for their respective query sets than the query templates [capital of {COUNTRY} ] and [gross domestic product of {COUNTRY}]. This is because the first two query templates correspond to query sets for which users desire the same particular fact, while the second two query templates correspond to query sets for which users desire different facts.

Other ways of measuring query equivalency can also be used.

The query templates may include additional data relating to the use and quality of the queries represented by the query template. Examples of such data include a unique query count (UQC), unique entity count (UEC), query click count (QCC), unique entity recall (UER), and template variation (TV). Other statistics or different statistics can also be stored.

The unique query count is proportional to the number of unique users determined to have entered a query that maps to the template. For example, if only one unique user is determined for a particular template, the unique query count is proportional to 1; likewise, if 1,000,000 unique users are determined for a particular template, the unique query count is proportional to 1,000,000. Generally, the higher the unique query count is for a query template, the higher the quality of the query template.

The unique entity count is proportional to the number of unique entities for a query template. For example, for the query template [{DISH} recipe], assume there are 1,000 instances (e.g., cheesecake, chicken soup, etc.) that map to the variable data "{DISH}." The unique entity count is thus proportional to 1,000. Generally, the higher the unique entity count is for a query template, the higher the quality of the query template.

The query click count is proportional to the sum of clicks attributed to each query that maps to the query template. For example, for the query template [{DISH} recipe], assume there are 1,000,000 selections attributed to the queries that map to the template. The query click count is thus proportional to 1,000. The query click count may also be normalized by the total number of search result impressions attributed to the queries that map to the query template. Again, the higher the query click count is for a query template, the higher the quality of the query template.

Unique entity recall is the ratio of the unique entity count to the total number of known entities that belong to the class of entities for the query template. For example, assume there are 36,500 known cities in the world, and assume the query template [population statistics of {CITY}] maps to set of queries in the query logs 114 that collectively specify 24,500 cities. The unique entity recall for the template is thus proportional to 24,500/36,500. Again, the higher the unique entity recall is for a query template, the higher the quality of the query template.

The template variation is a measure of the variance of (i) the popularity of entities that map to the template determined based on the queries which map to the template, from the (ii) the popularity of entities globally irrespective of queries which map to the template. The latter popularity, which, for each entity, is proportional to the selections of results for all queries that reference the entity, is a general popularity measure. The former popularity is specific to queries that map to the template and, for each entity, is proportional to the selections of results for the resulting query from the template. The template variation metric, in some implementations, is a histogram distance between two histograms. The first histogram is a first popularity histogram, measured using number of result clicks, of all entities which belong to the collection of the variable term across all queries. This histogram is independent of the template itself. The second histogram is a second popularity histogram, measured using number of result clicks, of all entities for the queries that belong to the template. The histograms can optionally be normalized between 0 and 1 before the distance is computed. A high distance indicates the distribution of the entities which instantiate a template is very different from the global popularity distribution of the entities independent of the template. The smaller the histogram distance, the better the query template is determined to be.

The metrics described above are example metrics for evaluating the quality of query templates, and other appropriate metrics can also be used. As will be described in more detail below, the query templates are used to identify implicit question queries, and in some implementations, the query metrics can be used to validate templates for which an implicit question query is identified.

Identification of Implicit Question Queries

As described above, often queries are received that are not in the form of a question. For example, a query may only specify an entity, and will not have any interrogative or other natural language terms. The search engine 110 thus includes a query question identifier 120, which is a subsystem (or system separate from the search engine 110) that identifies implicit question queries.

Figure 2:
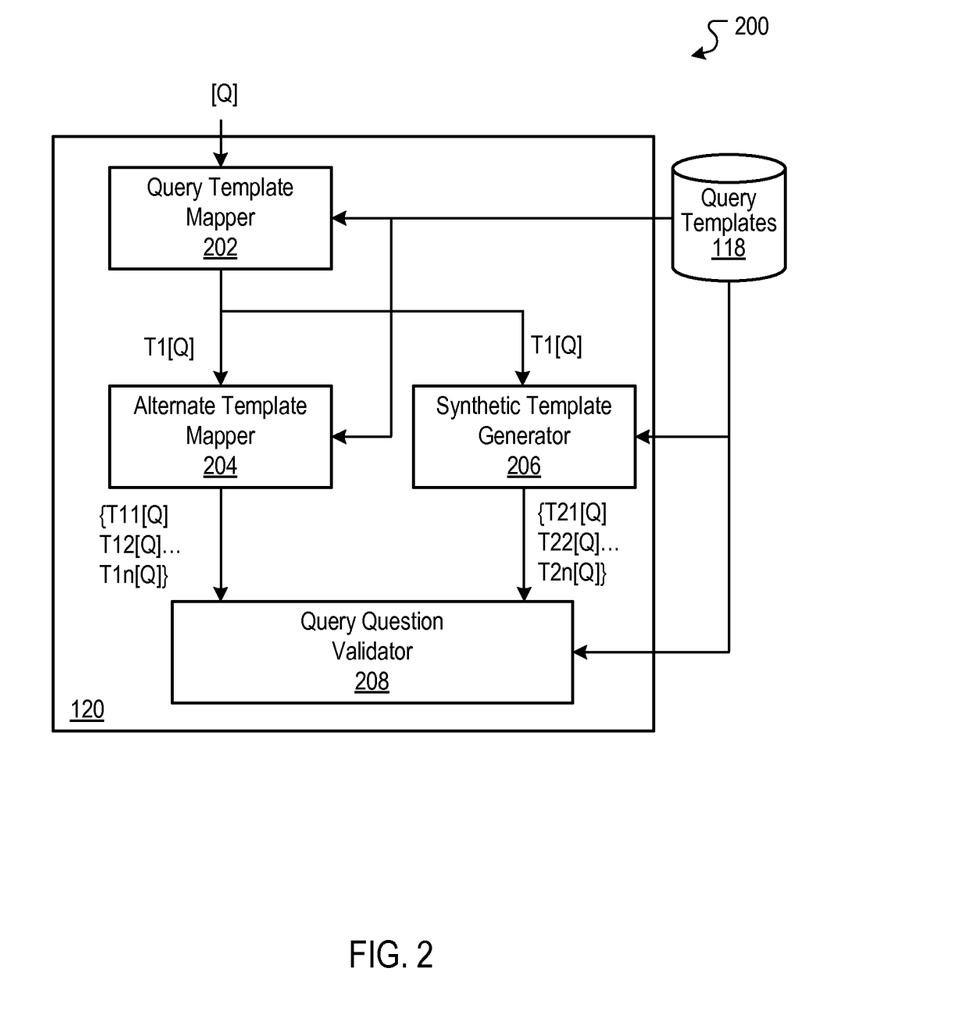
FIG. 2 is a system flow diagram of an example implementation of an implicit query question identifier.

FIG. 2 is a system flow diagram 200 of an example implementation of an implicit query question identifier 120. The architecture depicted in FIG. 2 is one example implementation, and other functional and architectural distributions can also be used. Operation of the query question identifier 120 is described with reference to FIGS. 3-6 below.

Figure 3:
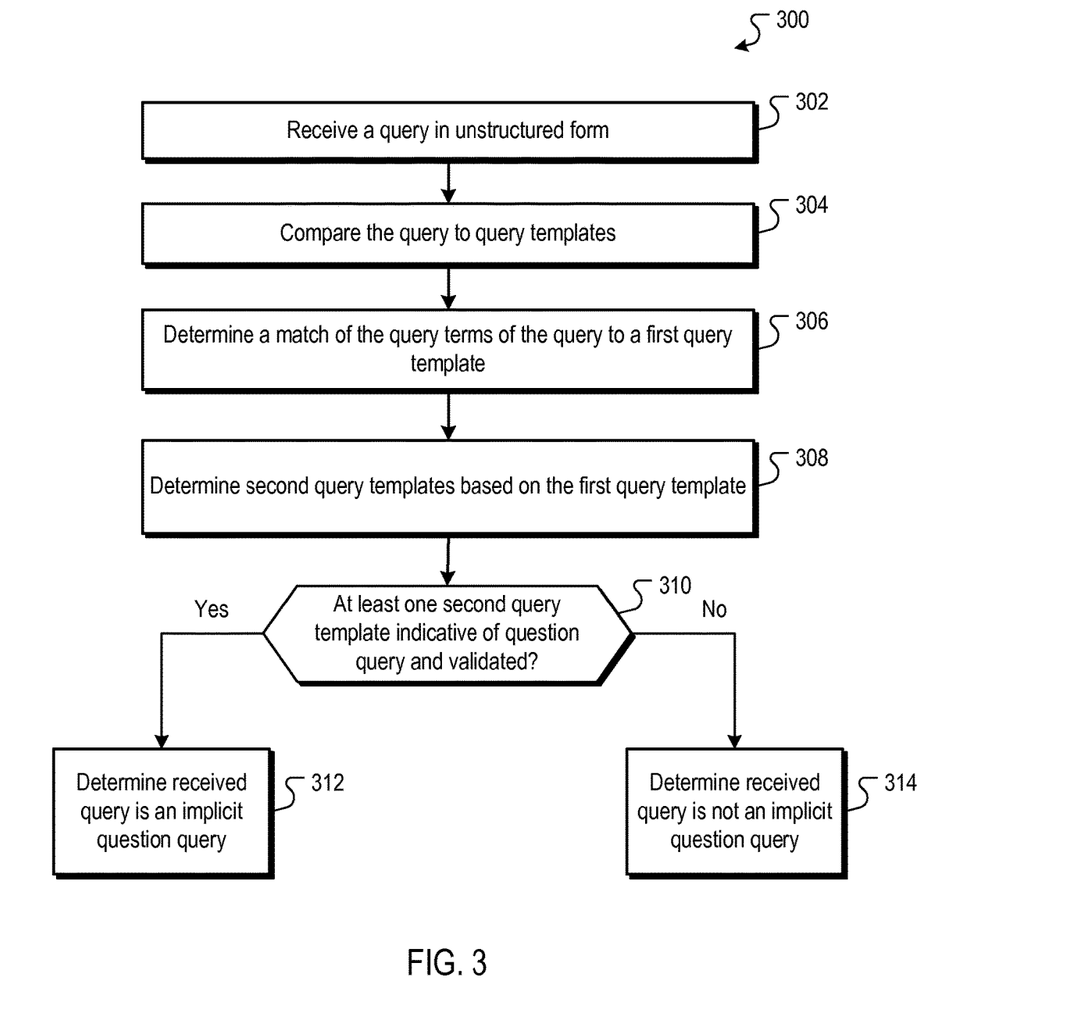
FIG. 3 is a flow diagram of an example process for identifying an implicit question query.

FIG. 3 is a flow diagram of an example process 300 for identifying an implicit question query. The process 300 can be implemented in the query question identifier 120.

The query question identifier 120 receives a query in unstructured form (302). For example, the query template mapper 202 receives a query that does not include Boolean operators, search operators, and is not in a natural language form. The query includes query terms, and each of the terms is at a respective ordinal position in the query. Examples of such queries are [recipe for cheesecake], [Pikes Peak height], etc. In FIG. 2, the query is represented as [Q].

The query question identifier 120 compares the query to query templates (304). For example, the query template mapper 202 compares the terms of the query to the query templates 118. As described above, each query template includes terms of variable data and terms of invariable data. The query template mapper 202 can identify variable and invariable terms in the received query, and generate potential templates from the query based on the variable and invariable terms. The potential templates are compared to the query templates to determine if a match exists. For example, for the query [recipe for cheesecake], the query template mapper may identify the term "cheesecake" is in instance of the invariable term "DISHES" and generate the potential template [recipe for {DISHES}].

The query question identifier 120 determines a match of the query terms of the query to a first query template (306). For example, the query template mapper 202 determines that query "recipe for cheesecake" matches the first query template [recipe for {DISHES}]. In FIG. 2, the first query template is represented at T1[Q]. Additionally, the first query template is not indicative of a question query, e.g., it does not being with an interrogative term. Accordingly, additional processing is done to determine whether the received query is an implicit question query.

The query question identifier 120 determines a second query template based on the first query template (308). In some implementations, the determination is based on at least a proper subset of terms of the first query template having a common syntax with at least a proper subset of terms of the second query template. A second query template has a proper subset of terms with a common syntax with the first query template when the proper subset of terms in the first template match, in sequence, a proper subset in the second template. To illustrate, for the two query templates [recipe for {DISHES}] and [what is a recipe for {DISHES}], the second query template has the proper subset of terms "recipe for {DISHES}" that has a common syntax with the terms "recipe for {DISHES}" of the first query template.

A second query template can also have a proper subset of terms with a common syntax with the first query template when the terms of the query closely match each other. Such matches can be determined by, for example, ignoring stop words, substituting prepositions, etc. For example, for the two query templates [recipe {DISHES}] and [what is a recipe of {DISHES}], the stop word "of" can be ignored, resulting in a match.

Other ways of determining second query templates can also be used, such as the examples described with respect to FIGS. 4 and 5 below. The processes described in these figures can be implemented in the alternate template mapper 204 and the synthetic template generator 206, respectively. The processes of FIG. 4 and FIG. 5 can be implemented together in a system, or, alternatively, a system may only use one of the processes. In FIG. 2, the query question identifier 120 utilizes both in parallel. Thus, for the query template T1[Q], one or more alternate templates {T11[Q], T12[Q] . . . T1n[Q]} are identified by the alternate template mapper 204, and one or more synthetic templates {T21 [Q], T22[Q] . . . T2n[Q]} are identified by the synthetic template generator 206.

The query question identifier 120 determines whether least one second query template is indicative of question query and whether the query template is validated (310). For example, the query question validator 208 performs a validation process on the query templates. The validation process may, in some implementations, differ for alternate query templates and synthetic query templates. In particular, and as will be described in more detail below, an equivalent query template, if it includes interrogatory terms, may have a less stringent validation process than a synthetic query template. This is because the synthetic query templates are not necessarily related to, or equivalent to, the first query template from which they are generated. Accordingly, the validation process for synthetic query templates may more aggressively reject synthetic query templates.

If the query question identifier 120 determines at least one second query template is indicative of question query and is validated, then the query question identifier 120 determines the received query is an implicit question query (312). A variety of subsequent operations may be triggered in response to this determination. For example, a query may be generated from the validated second query template, and a "fact" may be determined from the result (or determined from an information graph, such as a knowledge graph) and displayed in an answer box along with search results for the received query. Other operations can also be performed, such as asking the user to verify whether the user is seeking a particular fact.

If, however, the query question identifier 120 determines none of the second query templates are indicative of question query and validate, then the query question identifier 120 determines the received query is not an implicit question query (314).

Identification of Second Query Templates and Validation

As described above, two additional example ways of identifying second query templates are identify equivalent query templates and generating synthetic query templates. Each of these processes is described in detail below.

Figure 4:
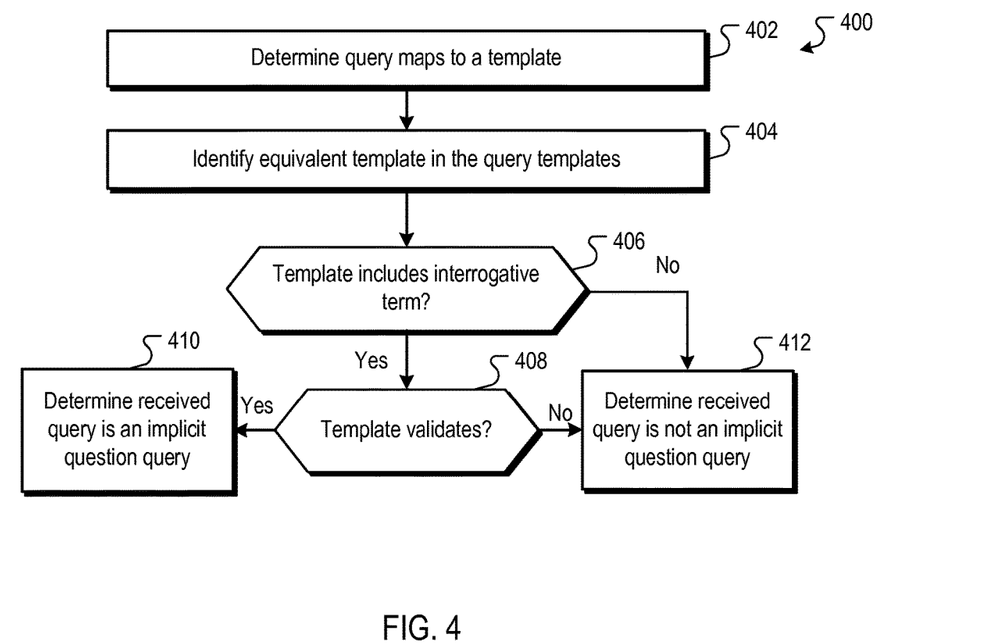
FIG. 4 is a flow diagram of an example process for identifying an implicit question query from query templates that are equivalent to a mapped query template.

FIG. 4 is a flow diagram of an example process 400 for identifying an implicit question query from query templates that are equivalent to a mapped query template, and the process 400 can be implemented in the query question identifier 120.

The query question identifier 120 determine the query maps to a first template (402). This operation is the same as the operation 302 described with reference to FIG. 3 above.

The query question identifier 120 identifies an equivalent template in the query templates (404). As described above, the query templates 118 may have data representing relations in the form of a graph structure, with each node representing a template and each edge between two template nodes representing an equivalency measure. For example, the query template [{DISHES} recipe] may have a corresponding node connected by an edge to a node for the query template [how to make {DISHES}]. Furthermore, the edge may indicate the two nodes are equivalent, e.g., the edge may have a weight that measures equivalence and the weight may meet a threshold. The equivalency measure may be based on, for example, co-click data. Likewise, the query template [{DISHES} recipe] may have a corresponding node connected by an edge to a node for the query template [{DISHES} cookware]. However, the edge may have a weight that is much less than the weight for the edge between the nodes for the templates [{DISHES} recipe] and [how to make {DISHES}]. The difference is due, for example, to the divergence in co-click data for search results for the node pairs. Thus, for the query template [{DISHES} recipe], the template [how to make {DISHES}] may be determined to be an equivalent template, while the template [{DISHES} cookware] may not be determined to be an equivalent template.

The query question identifier 120 determines whether the template includes an interrogative term (406). Example interrogative terms are how, what, where, when, who, or any other language term that frames, poses or conveys a question.

If the query question identifier 120 determines the template begins with an interrogative term, then the query question identifier 120 determines whether the template validates (408). If the template validates, then the query will be determined to be an implicit query question. If, however, the query does not validate, then the query is determined to not be an implicit question query (410). Query template validation is described in more detail below.

Figure 5:
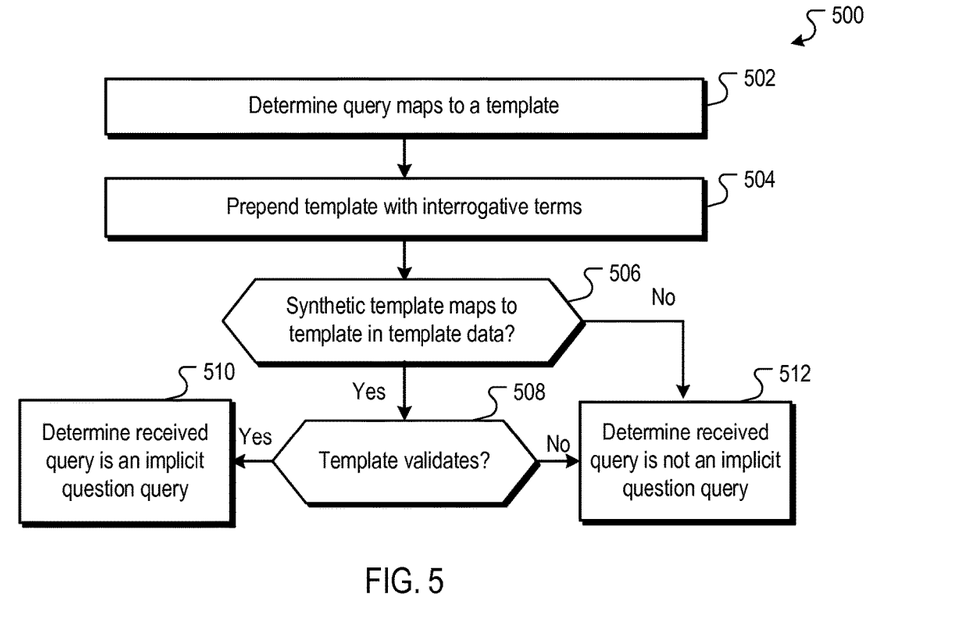
FIG. 5 is a flow diagram of an example process for identifying an implicit question query from synthetic query templates that are generated from a mapped query template.

FIG. 5 is a flow diagram of an example process 500 for identifying an implicit question query from synthetic query templates that are generated from a mapped query template. The process 500 can be implemented in the query question identifier 120. The process 500 of FIG. 5 differs from the process 400 of FIG. 4 in that the second query templates are first generated synthetically, and the query templates 118 are searched for the synthetic templates.

The query question identifier 120 determine query maps to a first template (502). This operation is the same as the operation 302 described with reference to FIG. 3 above.

The query question identifier 120 prepends (or appends, depending on the language) the query template with interrogative terms (504). A set of interrogative terms and phrases specific to a language is used. For example, for the query [{DISHES} recipe], the following synthetic templates may be generated:

[what is a {DISHES} recipe];
[who is {DISHES} recipe];
[when is {DISHES} recipe];
[where is {DISHES} recipe]; etc.

The query question identifier 120 determines, for each synthetic template, whether the synthetic template maps to template in the template data (506). For example, if a synthetic template exists in the template data 118, then the query question identifier 120 determines that the synthetic query template maps to the template data.

Not all synthetic query templates may map to the template date. For example, the synthetic query template [when is {DISHES} recipe] may not map to the data 118 because a query of that form may never have been received by the search engine 110.

If the query question identifier 120 determines that a synthetic template maps to a template in the template data, then the query question identifier 120 determines whether the template validates (512). If the template validates, then the query will be determined to be an implicit query question. If, however, the query template does not validate, then the query is determined to not be an implicit question query (510).

For example, for the four synthetic queries above, assume that only the following two map to query templates in the template data: [what is a {DISHES} recipe] and [where is {DISHES} recipe]. Should either of these templates validate, then the query is determined to be an implicit question query.

Validation of either an alternate template or a synthetic template can, in some implementations, be based on one or more of the following query template metrics: the unique query count (UQC), the unique entity count (UEC), the query click count (QCC), the unique entity recall (UER), and the template variation (TV). Other statistics or different statistics can also be used for validation. Furthermore, thresholds for validation may differ based on whether the query template is an alternate template that is related to the first template that maps to the received query, or a synthetic template that may or may not be related to the first template. In the case of an alternate template, the threshold(s) may be lower than for a synthetic template as the template data 118 already indicates that the second query template is an equivalent to the first query template.

Conversely, in the case of a synthetic template, the threshold(s) may be higher than for an alternate template as the second template may be unrelated to the first template. For example, for the two templates [what is a {DISHES} recipe] and [where is {DISHES} recipe], the first template may have a unique query count, unique entity count, unique entity recall and query click count that meet corresponding validation thresholds. This is because queries that map to this template may be received from many users and for many different recipes. However, the query template [where is {DISHES} recipe], while also in the query template data 118, may not have one or more of a unique query count, unique entity count, unique entity recall and query click count that meet corresponding validation thresholds. This is because that while queries that map to this template may have been received from user devices, so few queries may have been received, and/or the quality of the documents that are identified in response to the query fail to elicit a sufficient number of clicks, that the query template cannot validate. Thus, the validation check reduces the likelihood that a query may be identified as an implicit question query based solely on low quality queries that are poorly formed expressions of users' informational needs.

A variety of appropriate validation checks can be made using the template statistics. For example, in some implementations, each statistic for a query template must meet a corresponding validation threshold for the query template to validate. In other implementations, a majority of statistics must meet corresponding validation thresholds. In yet other implementations, the statistics can be combined in some form in a function to yield a result that is compared to a validation threshold.

In some implementations, a validation check can also involve generating a query from the synthetic query and processing query statistics specific to that query. For example, for the synthetic query template [what is a {DISH} recipe] generated in response to the query [eggplant recipe], query statistics for the query [what is a eggplant recipe] may be processed. The query statistics may include query submission frequency, selection (click) counts of results responsive to the query, etc. Various thresholds corresponding to the query can be used to determine whether the template is acceptable.

Pruning Queries

Sometimes implicit question queries may have several qualifiers that reduce recall when identifying corresponding query templates. For example, the following query is a question query seeking the age of Ima Starr, a fictional celebrity that hosts a program "Find A Star" on a fictional network XYZ:

[age of Ima Starr from Find A Star on Network XYZ]

Thus, in some implementations, the query template mapper 202 may prune the query and process a root portion of the query, or the root portion and one or more pruned portions. One example pruning process is to select up to K-word long substrings of terms of the query, i.e., a proper subset of the query terms that is a set sequentially ordinal terms and being no longer that K terms. These proper subset sets are then compared to the query templates. For example, for the query above, the query template mapper may select substrings from three to five words in length, e.g.:

[age of Ima];
[age of Ima Starr];
[age of Ima Starr from];
[of Ima Starr];
[of Ima Starr from]; etc.

Each proper subset can then be processed as a separate query in a manner described above. Should any proper subset be determined to be an implicit question query, then the entire query is determined to be an implicit question query.

Figure 6:
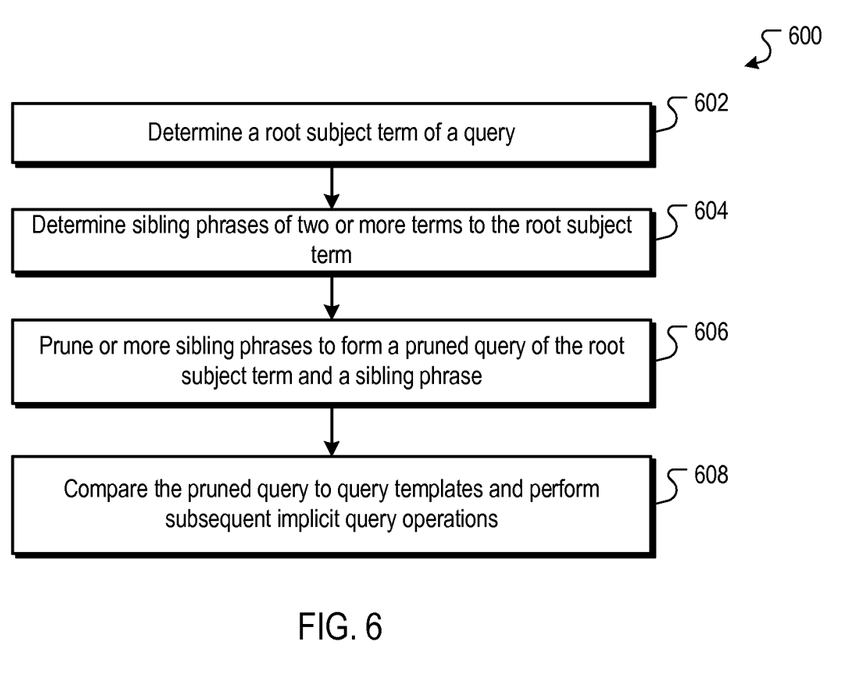
FIG. 6 is a flow diagram of an example process for pruning a received query prior to processing the query to determine whether the query is an implicit question query.

In another implementation, a dependency parse tree can be used to remove qualifier terms and process a root term. The parse tree can be constructed, for example, using a bottom-up parse based on grammars or other language models. One example process that incorporates a dependency parse is shown in FIG. 6, which is a flow diagram of an example process 600 for pruning a received query prior to processing the query to determine whether the query is an implicit question query. The process 600 can be implemented in the query question identifier 120.

The query question identifier 120 determines a root subject term of a query (602). For example, the query template mapper 202 may determine that a first noun that is modified by a prepositional phrase acting as an adjective can be a root subject term. Thus, in the example above, "age," is the object of the prepositional phrase "of Ima Starr."

The query question identifier 120 determines sibling phrases of two or more terms to the root subject term (604). For example, prepositional phrases, adverb phrases, etc., can be determined to be sibling phrases.

The query question identifier 120 prunes one or more sibling phrases to form a pruned query of the root subject term and a sibling phrase (606). For example, the closest phrase to the root subject term may be used. In the example above, the pruned query is "[age of Ima Starr].

The query question identifier 120 compares the pruned query to query templates and perform subsequent implicit query operations (608). For example, the process 300 may be performed using the query [age of Ima Starr] as input.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented in a data processing apparatus, the method comprising:
    receiving, at the data processing apparatus, a query in unstructured form, the query including a plurality of terms, each of the terms at a respective ordinal position in the query;
    comparing, by the data processing apparatus, the terms of the query to a plurality of query templates, each query template including terms of variable data and terms of invariable data, wherein the terms of variable data specifies a class of terms and the terms of invariable data specifies particular instances of terms;
    determining, by the data processing apparatus and based on the comparison, a match of the query terms to a first query template, wherein the first query template is not determined to be indicative of a question query;
    determining, by the data processing apparatus and based on the first query template, a second query template; and determining, by the data processing apparatus, that the query is an implicit question query in response to the second query template being indicative of a question query;

wherein determining, based on the first query template, the second query template comprises:

generating synthetic templates from the first template, each synthetic template being the first template in combination with one of a corresponding plurality of question prefix terms; and determining that one of the synthetic templates specify the second query template in the plurality of query templates.

2. The method of claim 1, further comprising validating the second query template based on query statistics of queries that match the second query template.

3. The method of claim 2, wherein validating the second query template comprises validating the second query template based on one or more of a unique query count statistic, a unique entity count statistic, a query click count statistic, a unique entity recall statistic, and a template variation statistic.

4. A method implemented in a data processing apparatus, the method comprising:

receiving, at the data processing apparatus, a query in unstructured form, the query including a plurality of terms, each of the terms at a respective ordinal position in the query;

comparing, by the data processing apparatus, the terms of the query to a plurality of query templates, each query template including terms of variable data and terms of invariable data, wherein the terms of variable data specifies a class of terms and the terms of invariable data specifies particular instances of terms;

determining, by the data processing apparatus and based on the comparison, a match of the query terms to a first query template, wherein the first query template is not determined to be indicative of a question query;

determining, by the data processing apparatus and based on the first query template, a second query template; and determining, by the data processing apparatus, that the query is an implicit question query in response to the second query template being indicative of a question query;

wherein:

comparing the terms of the query comprises selecting proper subsets of terms of the query, each proper subset being sequentially ordinal terms and being no longer than k terms; and comparing the terms of the query to a plurality of query templates comprises comparing each proper subset of query terms to the plurality of query templates.

5. A method implemented in a data processing apparatus, the method comprising:

receiving, at the data processing apparatus, a query in unstructured form, the query including a plurality of terms, each of the terms at a respective ordinal position in the query;

comparing, by the data processing apparatus, the terms of the query to a plurality of query templates, each query template including terms of variable data and terms of invariable data, wherein the terms of variable data specifies a class of terms and the terms of invariable data specifies particular instances of terms;

determining, by the data processing apparatus and based on the comparison, a match of the query terms to a first query template, wherein the first query template is not determined to be indicative of a question query;

determining, by the data processing apparatus and based on the first query template, a second query template; and determining, by the data processing apparatus, that the query is an implicit question query in response to the second query template being indicative of a question query;

wherein:

comparing the terms of the query comprises:

determining a root subject term of the query;

determining sibling phrases of two or more terms to the root subject term, each sibling phrase not including the root subject term and not including terms common to other sibling phrases;

pruning one or more sibling phrases to form a pruned query of the root subject term and at least one sibling phrase; and comparing the terms of the query to a plurality of query templates comprises comparing the terms of the pruned query to the plurality of query templates.

6. A system, comprising:

one or more data processing apparatus; and one or more data stores in communication with the one or more data processing apparatus and storing instructions that upon execution cause the one or more data processing apparatus to perform operations comprising:

receiving a query in unstructured form, the query including a plurality of terms, each of the terms at a respective ordinal position in the query;

comparing the terms of the query to a plurality of query templates, each query template including terms of variable data and terms of invariable data, wherein the terms of variable data specifies a class of terms and the terms of invariable data specifies particular instances of terms;

determining, based on the comparison, a match of the query terms to a first query template, wherein the first query template is not determined to be indicative of a question query;

determining, based on the first query template, a second query template; and determining that the query is an implicit question query in response to the second query template being indicative of a question query;

wherein determining, based on the first query template, the second query template comprises:

generating synthetic templates from the first template, each synthetic template being the first template in combination with one of a corresponding plurality of question prefix terms; and determining that one of the synthetic templates specify the second query template in the plurality of query templates.

7. The system of claim 6, wherein the operations further comprise validating the second query template based on query statistics of queries that match the second query template.

8. The system of claim 7, wherein validating the second query template comprises validating the second query template based on one or more of a unique query count statistic, a unique entity count statistic, a query click count statistic, a unique entity recall statistic, and a template variation statistic.

9. A system, comprising:
one or more data processing apparatus; and
one or more data stores in communication with the one or more data processing apparatus and storing instructions that upon execution cause the one or more data processing apparatus to perform operations comprising:
receiving a query in unstructured form, the query including a plurality of terms, each of the terms at a respective ordinal position in the query;
comparing the terms of the query to a plurality of query templates, each query template including terms of variable data and terms of invariable data, wherein the terms of variable data specifies a class of terms and the terms of invariable data specifies particular instances of terms;
determining, based on the comparison, a match of the query terms to a first query template, wherein the first query template is not determined to be indicative of a question query;
determining, based on the first query template, a second query template; and
determining that the query is an implicit question query in response to the second query template being indicative of a question query;
wherein:
comparing the terms of the query comprises selecting proper subsets of terms of the query, each proper subset being sequentially ordinal terms and being no longer than k terms; and
comparing the terms of the query to a plurality of query templates comprises comparing each proper subset of query terms to the plurality of query templates.

10. A system, comprising:
one or more data processing apparatus; and
one or more data stores in communication with the one or more data processing apparatus and storing instructions that upon execution cause the one or more data processing apparatus to perform operations comprising:
receiving a query in unstructured form, the query including a plurality of terms, each of the terms at a respective ordinal position in the query;
comparing the terms of the query to a plurality of query templates, each query template including terms of variable data and terms of invariable data, wherein the terms of variable data specifies a class of terms and the terms of invariable data specifies particular instances of terms;
determining, based on the comparison, a match of the query terms to a first query template, wherein the first query template is not determined to be indicative of a question query;
determining, based on the first query template, a second query template; and
determining that the query is an implicit question query in response to the second query template being indicative of a question query;
wherein:
comparing the terms of the query comprises:
determining a root subject term of the query;
determining sibling phrases of two or more terms to the root subject term, each sibling phrase not including the root subject term and not including terms common to other sibling phrases;
pruning one or more sibling phrases to form a pruned query of the root subject term and at least one sibling phrase; and
comparing the terms of the query to a plurality of query templates comprises comparing the terms of the pruned query to the plurality of query templates.

* * * * *